June 27, 1967
S. E. KEAGLE
3,327,692
ROTARY INTERNAL COMBUSTION ENGINE
Filed Oct. 13, 1965
4 Sheets-Sheet 1
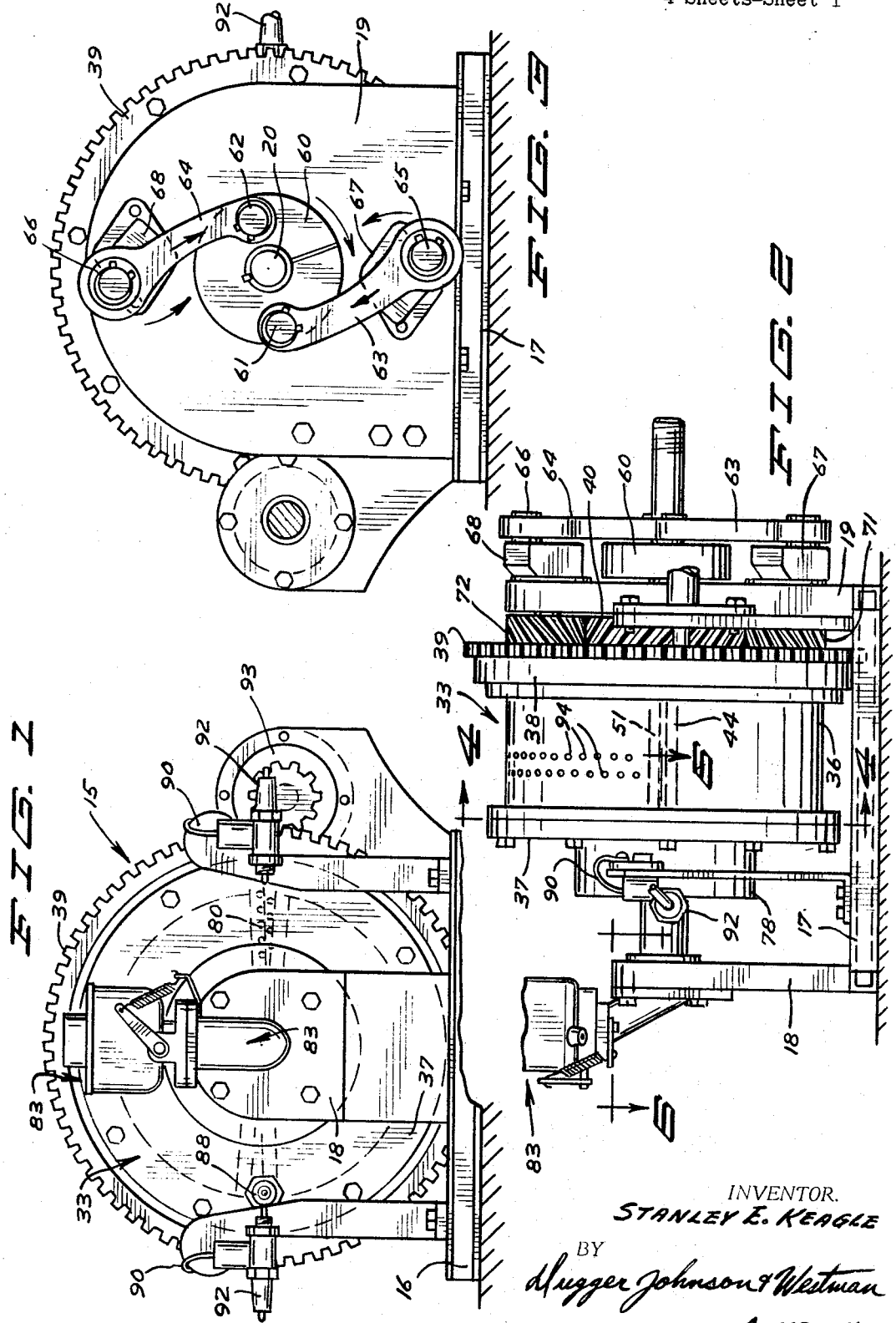
INVENTOR.
STANLEY E. KEAGLE
BY
Dugger Johnson & Westman
ATTORNEYS June 27, 1967  S. E. KEAGLE  3,327,692
ROTARY INTERNAL COMBUSTION ENGINE
Filed Oct. 13, 1965  4 Sheets-Sheet 2
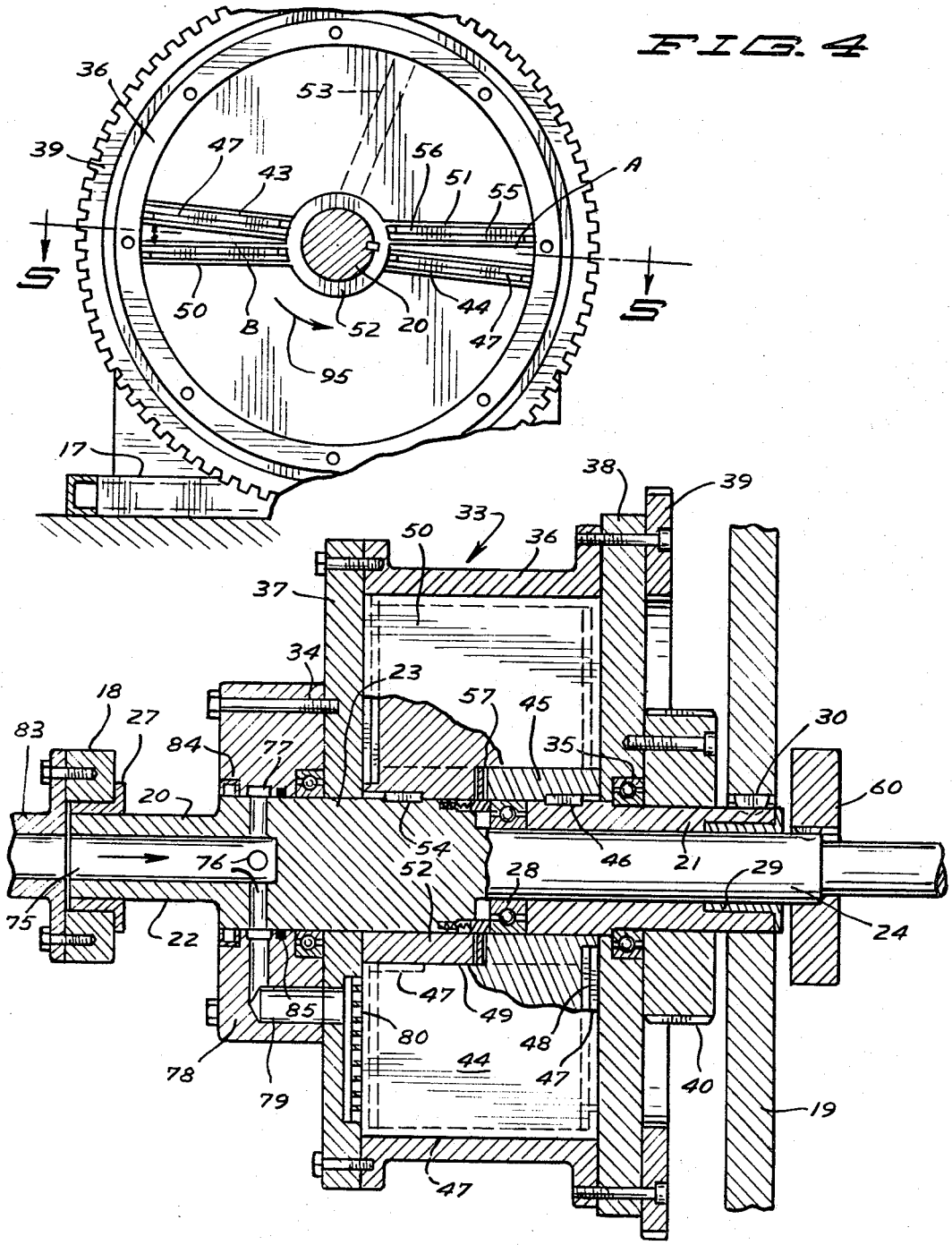
INVENTOR.
STANLEY E. KEAGLE
BY
Dugger Johnson & Westman
ATTORNEYS

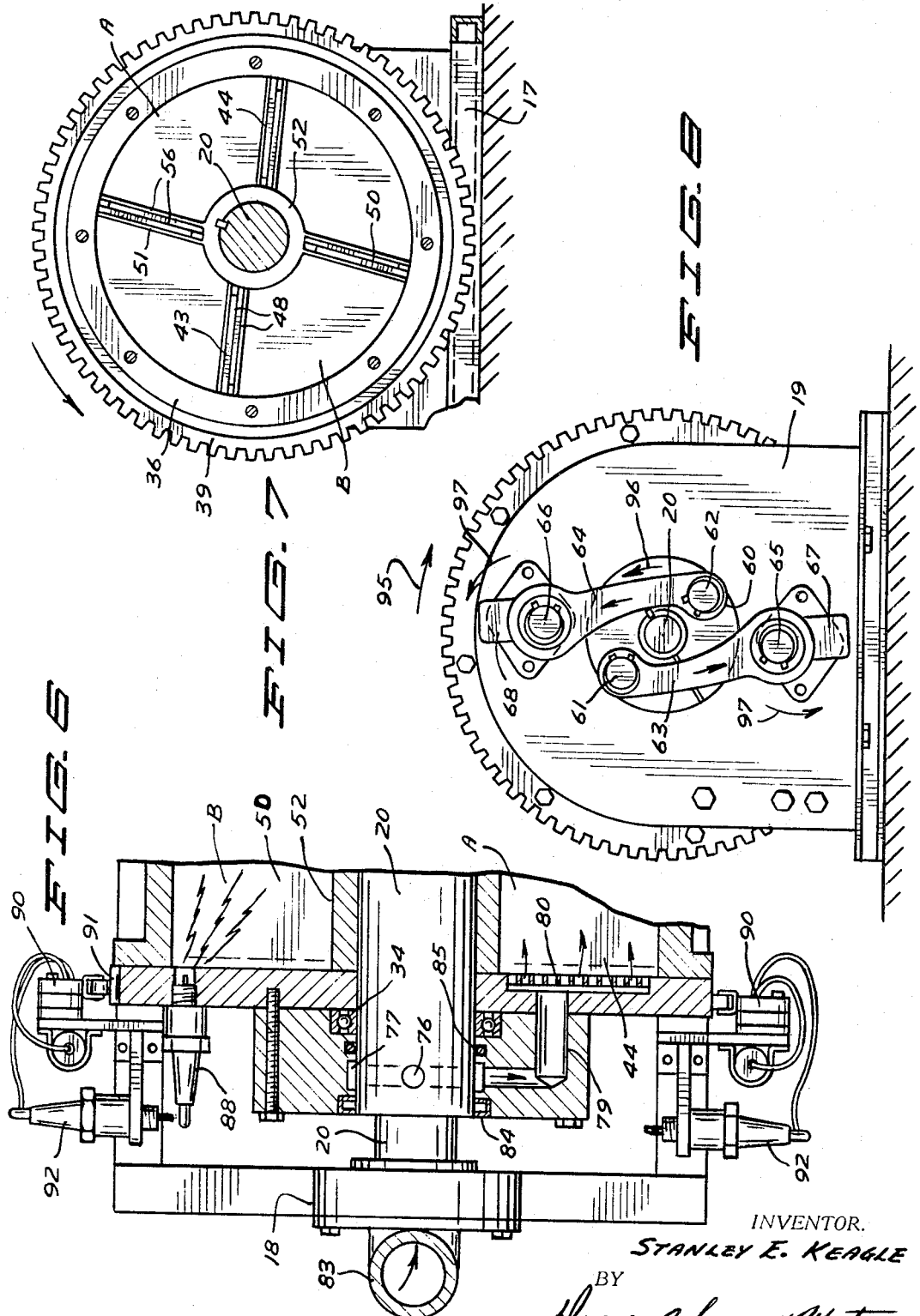

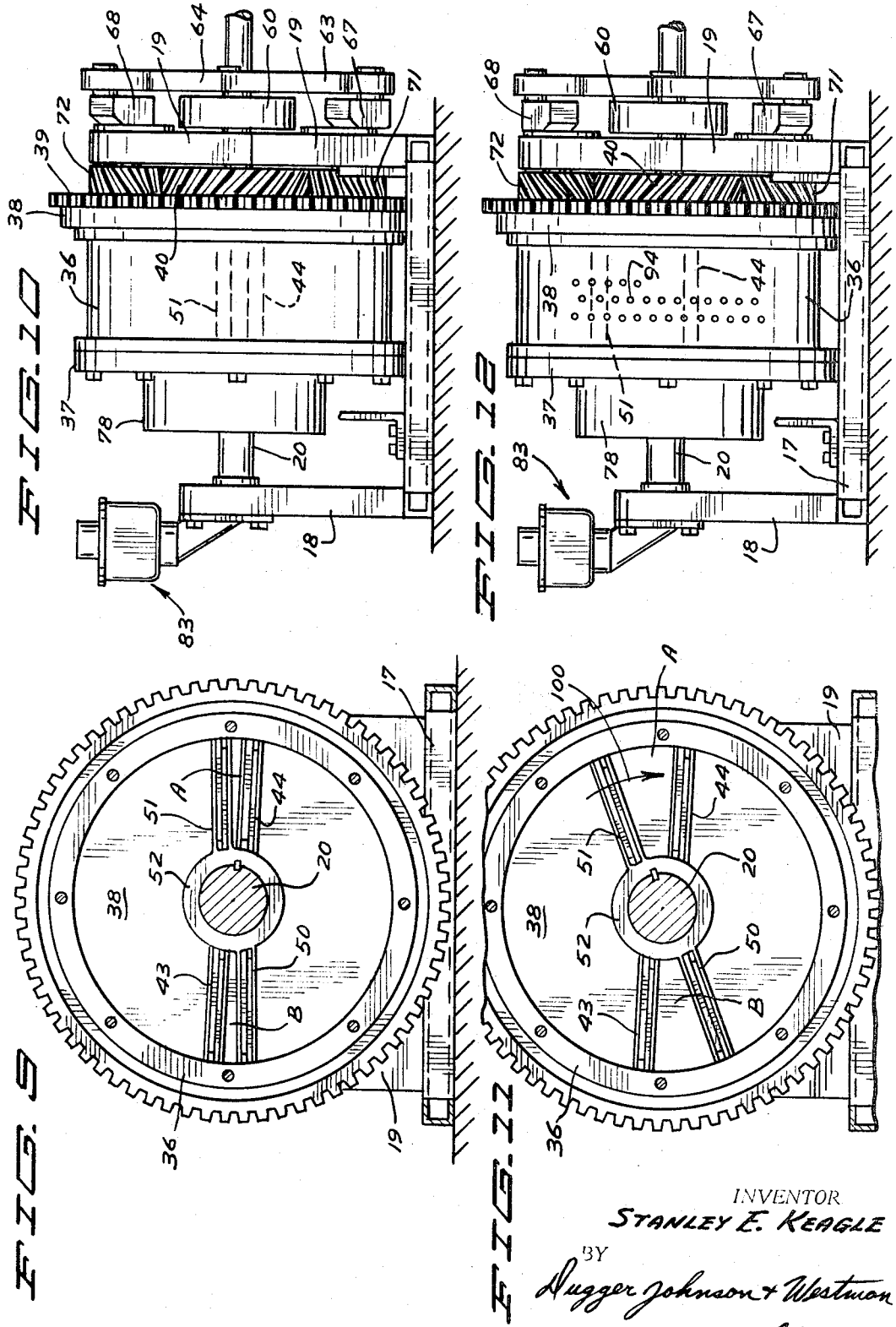

United States Patent Office 3,327,692
Patented June 27, 1967

3,327,692
ROTARY INTERNAL COMBUSTION ENGINE
Stanley E. Keagle, 2626 Nassau St.,
Sarasota, Fla. 33581
Filed Oct. 13, 1965, Ser. No. 495,418
11 Claims. (Cl. 123—43)

The present invention has relation to a rotary engine and more particularly to a rotary internal combustion engine which has a rotating outer case from which power can be taken.

The field of rotary internal combustion engines has been greatly expanding, and yet there does not appear to be any dominant design on the market. Part of the problem is that the present devices are complex in operation, difficult to manufacture, and have many problems, such as sealing the cylinders and making the parts within tolerance.

The device of the present invention presents a rotary engine which has a rotating outer housing. The outer housing is used to house two pairs of vanes which form opposed variable volume chambers. One vane of each pair remains stationary while the other vane of each pair oscillates back and forth. This relative movement provides four strokes of the engine cycle corresponding to the four stroke cycle of a reciprocating piston engine. This provides the power for rotating the outer case.

Power can be taken from the engine by gearing to the outer case very easily. The engine is easy to balance, compact, and develops high horsepower per pound of weight.

It is therefore an object of the present invention to present a new type of rotary internal combustion engine having an outer case that rotates under power.

It is another object of the present invention to present a rotary engine that has members which oscillate about a common axis to form chambers for developing power to the engine.

Other objects are those inherent in the specification and will be apparent as the description proceeds.

In the drawings,

FIG. 1 is a front elevational view of a rotary engine made according to the present invention;

FIG. 2 is a side elevational view of the rotary engine of FIG. 1;

FIG. 3 is a rear elevational view of the rotary engine of FIG. 1;

FIG. 4 is a fragmentary enlarged sectional view taken as on line 4—4 in FIG. 2;

FIG. 5 is a sectional view taken as on line 5—5 in FIG. 4;

FIG. 6 is a fragmentary enlarged sectional view taken as on line 6—6 in FIG. 2;

FIG. 7 is a sectional view taken on substantially the same line as FIG. 4 and showing the right hand portion of the engine in position just before the compression stroke commences;

FIG. 8 is a rear elevational view of the engine in the same relative position as FIG. 7;

FIG. 9 is a sectional view taken on the same line as FIG. 7 showing the right hand portion of the engine in compression position just before firing;

FIG. 10 is a side elevational view of the engine of FIG. 9;

FIG. 11 is a sectional view taken on the same line as FIG. 9 and showing the engine with the right hand portion of the engine after completion of the power stroke and during its exhaust stroke and having partially exhausted the gases in the chamber; and FIG. 12 is a side elevational view of the engine in the same position as FIG. 11.

Referring to the drawings and the numerals of reference thereon, and in particular FIGS. 1–6, the rotary engine illustrated generally at 15 has a mounting frame 16 which is supported in the place where the engine is to be installed. The mounting frame 16 comprises a base plate 17, and a pair of spaced apart, upright end plates 18 and 19, respectively, at opposite ends of the base plate. The upright end plates 18 and 19 are used for supporting a pair of mutually concentric first and second shafts 20 and 21. The first shaft 20 has a first end portion 22, an enlarged center section 23 and a second end portion 24 which is turned down in diameter from the large portion. The second shaft 21 is tubular and is rotatably mounted over the second end portion 24 of the shaft 20. The first end portion 22 of shaft 20 is rotatably mounted in a bushing 27 and this bushing in turn is mounted in the upright mounting plate 18.

The second shaft 21 is mounted on the outer end portion 24 of shaft 20 through a bearing 28 (that supports a hub 45 keyed to shaft 24) and a bushing 29. The shaft 21 is also keyed with a key 30 to the mounting plate 19. The shaft 21 does not rotate, but the shaft 20 is free to move about its axis inside the shaft 21. As will be explained later, the shaft 20 oscillates back and forth about its axis during operation of the engine.

The rotary cylinder assembly illustrated generally at 33 is rotatably mounted at a first end thereof through a bearing 34 onto the center portion 23 of the shaft 20 and is rotatably mounted to the second end portion thereof through a bearing 35 to the outer surface of shaft 21. The cylinder assembly 33 includes a tubular center portion 36 that has a first end plate 37 sealingly mounted thereon and a second end plate 38 also sealingly mounted thereon. The axis of the tubular center portion coincides with the axes of shafts 20 and 21. A ring gear 39 is bolted adjacent the periphery of end plate 38, and a smaller gear 40 is also bolted to the outer surface of end plate 38. The gear 40 surrounds the shaft 20 and rotates with the cylinder assembly 33. The ring gear 39 can be used for taking off power from the engine or can be used as a starter ring, or both.

The combustion chambers or "cylinders" (the chambers are called this for convenience only) are formed by four vanes inside the tubular portion 36. A first pair of stationary vanes or elements illustrated at 43 and 44, respectively, are fixedly mounted (welded) onto a hub 45 which in turn is keyed with a key 46 to the shaft 21. It should be noted that the bearing 28 actually rides on the inside surface of the hub 45, and because the hub closely fits the shaft 21 and is keyed thereto, the bearing holds the shaft 21 centered on the shaft 20. As can be seen, the vanes 43 and 44 are plate-like and rectangular in shape and have grooves illustrated at 47 around their peripheral edges. Suitable sealing strips 48 are mounted in these grooves so that they will seal against the inside surfaces of the end plates 37 and 38 and around the inside surface of the tubular member 36. As shown, the vanes 43 and 44 also have notches 49 at the outer ends thereof which provide a recess to permit the hub for the movable vanes to move therein. The vanes extend outwardly from the hub. The planes of the vanes are parallel to the axis of the shafts, but they are not radial vanes. The vanes are offset slightly as shown. The vanes 43 and 44 are parallel.

A pair of movable or oscillating vanes or pistons 50 and 51 are fixedly mounted onto a hub 52. The planes of the oscillating vanes or elements are positioned slightly offset from each other and are on opposite sides of the hub. The vanes 50 and 51 mate with the stationary vanes 43 and 44. One of the oscillating vanes mates with one of the stationary vanes. The oscillating vanes 51 will move between the solid position as shown in FIG. 4 and approximately the position as shown in dotted lines at 53 in FIG. 4 (or as shown in FIG. 7) during operation of the engine. When the oscillating vane 51 is at its upper position as shown in dotted lines at 53, the spaces between each of the oscillating vanes and its mating stationary vane will form a "cylinder" or chamber of the motor.

The hub 52 is of size to sealingly (with sealing strips) fit within the notches 49 of the stationary vanes and move with respect to these vanes without interference. The hub 52 is mounted onto the center section 23 of shaft 20 with a key 54 so that it will move whenever the shaft 20 moves. The oscillating vanes also have grooves 55 around the periphery thereof and there are sealing strips 56 mounted in these grooves to form a sliding seal between the vane and its mating surfaces. Two strips are used side by side in each groove. The surface seal strip 56 can be of cast iron or other suitable material which will seal against the surfaces to prevent escape of combustion fluids under normal combustion pressures. Small leaf springs can be placed behind the strips 56 and 48 to urge them outwardly against the surfaces on which they seal. The strips 56 and 48 can be made of any suitable material, for example, cast iron.

It should be noted that inbetween the inner end of shaft 21, adjacent bearing 28, and the shoulder formed by the center section 23 of shaft 20, a seal member 57 is also utilized to prevent leakage of gases past the shaft in this area. This seal member can be spring loaded, as shown and be of any suitable design for the function. It is annular, of course, to seal around the periphery of the shaft.

The second end portion 24 of the shaft 20 extends outwardly beyond the end plate 19 and a crank flange 60 is drivably mounted thereon. The flange 60 is keyed to the shaft and clamped in place. The flange 60 has a pair of drive pins 61 and 62 fixed thereto and spaced 180° apart. A pair of connecting rods 63 and 64 are rotatably mounted onto the crank pins 61 and 62 respectively. These connecting rods in turn extend outwardly from the pins and are rotatably mounted onto crank pins 65 and 66, respectively, of a pair of crank shafts 67 and 68. The crank shafts 67 and 68 in turn are each rotatably mounted through the end plate 19 and separate planet gears 71 and 72 are drivably mounted to the inner ends of the crank shafts, respectively. The planet gears mesh with the gear 40 which rotates with the cylinder assembly.

The first end 22 of the shaft 20, as shown, has a longitudinally extending axial opening 75 defined therein. The opening 75 extends inwardly and communicates with a plurality of radially extending ports 76 drilled into the shaft. The ports 76 in turn communicate with an annular chamber 77 defined in a hub 78 that is attached to the front end plate 37 of the cylinder assembly. The chamber 78 communicates through a passageway 79 to a plurality of orifices 80 that are drilled into the end plate and open into the interior chamber of the tubular portion 36 of the cylinder assembly. This provides the intake passageway for the unit and a carburetor assembly 83 is mounted onto the support plate 18 and has a passageway which opens into the opening 75.

The hub 78 has seal members 84 and 85 on opposite sides of the chamber 77.

A spark plug 88 is mounted in the end plate 37 and opens into the interior chamber of the center section of the cylinder assembly. The spark plug is placed adjacent the outer peripheral edge of the cylinder. On each side of the frame, a separate coil, condenser and breaker point unit, illustrated generally at 90, is mounted. These serve as the ignition system for the motor. The breaker points are actuated by being tripped with a small lug 91 mounted in the end plate 37. The timing of the spark is controlled by changing the position of the lug.

The spark is created in a normal manner with the breaker points and coil and is transferred through a spark intensifier 92 which is positioned to align with the outer end of spark plug 88 and be very closely spaced therefrom when the plug passes by. The lug 91 is placed so that it will trip at the appropriate time to send a spark through the spark intensifier 92 across the gap and through the aligned spark plug and thus create a spark inside the combustion chambers formed by the flaps to explode the charge in the chambers. The plug rotates with the cylinder so that there is a running clearance between the plug and the spark intensifier.

A plurality of exhaust ports or openings 94 are drilled through the wall of the tubular center section 36 of the cylinder assembly and are positioned so that the hot gases will be exhausted right out through these ports during operation. A manifold can be placed around the periphery to collect the exhaust gases and an exhaust pipe can also be provided.

A starter motor can be mounted onto a bracket 93 for initially starting the engine, if desired. The carburetor of course will be hooked up to a source of fuel in the usual way.

OPERATION

The engine as shown operates with two power chambers or "cylinders" and is a four cycle engine, each chamber having an intake stroke, compression stroke, power stroke and exhaust stroke. For convenience of nomenclature, the chambers will be labeled chamber A and chamber B. The chamber A is formed between the stationary vane 44 and the movable vane or piston 51. Chamber B is formed between the stationary vane 43 and the movable vane or piston 50. As shown in FIG. 4, in this position, chamber A is just starting on its intake stroke and chamber B is just starting the power stroke (the combustion mixture is being ignited by the ignition coil 90 and spark plug 88, see FIG. 1). Referring to FIG. 1, it can be seen that the intake ports 80 are aligned with the space in chamber A between the stationary vane 44 and the movable vane 51 and that the spark plug 88 is aligned with the space between the stationary vane 43 and the movable vane 50 of chamber B. The spark plug fires, forcing a rapid expansion of the compressed gases (this chamber previously has performed its intake stroke and compression stroke) exerting a force on the movable vane 50 tending to rotate it in direction as indicated by the arrow 95 in FIG. 4. As the stationary vane 43 is fixed to the frame, it will not move. Therefore, the explosion will cause this rotation of the vane 50. This will in turn drive the shaft 20 through the hub 52 for the vane. As the shaft 20 rotates it will rotate the drive flange 60 causing the pins 61 and 62 to also rotate. These in turn drive the connecting rods 63 and 64 thereby rotating the cranks 67 and 68, driving the gears 71 and 72 which in turn will rotate the gear 40 and thereby rotate the outer cylinder assembly 35. The gear ratio is such that the planet gears 71 and 72 rotate twice for every revolution of the cylinder assembly.

As the vane 50 moves in direction as indicated by arrow 95, the vane 51 will also move. As it does this, it creates a negative pressure inside the space in chamber A between the vane 51 and stationary vane 44 and this draws in a charge of fuel and air from the carburetor, through passage 75, port 76, passage 79 and ports 80 to fill the combustion chamber with the fuel and air mixture. The intake ports 80 in plate 37 will follow around as the cylinder 36 turns and actually will follow the travel of the vane 51 up to its maximum intake position shown at 53 (this is shown in dotted lines in FIG. 4). This maximum intake position of the vane 51 and the end of the power stroke position of the vane 50 is shown in solid lines in FIG. 7. The positions of the connecting rods and crank arms when the unit has reached this maximum position is shown in FIG. 8. When the intake stroke for chamber A commences, the exhaust ports 94 have moved past the vane 51, as seen in FIG. 2. Once the maximum position is reached there is no longer a drive effect on vane 50. The crank arms 67 and 68 are rotating in direction as shown by arrow 97 in FIG. 8 and the axes of the crank arm, crank pins and pins on flange 60 reach a dead center position.

The flywheel effect of the cylinder housing, which is relatively heavy, will then carry the cylinder around in direction as indicated by the arrow 95 (FIG. 8 and FIG. 4). As the cylinder rotates the inertia thereof will drive the gear 40 which in turn will drive the planet gears 71 and 72. The rotation of the planet gears will move the cranks 67 and 68 past their dead center position, still rotating as shown by arrows 97. The cranks will then pull on rods 63 and 64. The hub 60 will be pulled by the connecting rods in opposite direction from that indicated by arrow 95, or in other words in direction as indicated by arrow 96 in FIGS. 8 and 4.

When this happens, the vanes 51 and 50 will also reverse in direction. Vane 51 in chamber A will move back toward flap 44 and start to compress the charge of air and fuel in the chamber. As the cylinder 36 itself will continue to rotate in the direction as indicated by arrow 95, the ports 80 will move past the edges of movable vane 51 so that the chamber of chamber A is sealed off.

The exhaust ports 94, at this time, will start to clear the stationary vane 43 of chamber B and as the vane 50 moves back toward the vane 43, the combusted gases in chamber B will be exhausted out through these ports. There are a plurality of exhaust ports extending around the periphery of the cylinder.

In FIG. 9, chamber A is shown in its fully compressed stroke and chamber B is at the end of its exhaust stroke, just about set to start the intake stroke. The spark plug 88 will have rotated to position to be aligned with the chamber A when it is in its position as shown in FIG. 9. The ignition will be tripped and will fire the combustible gases. The crank arm will be carried over center to reverse direction of the flaps. This will then drive the vane 51 to rotate the shaft 20 and the crank flange 60 and power will be applied to the rotating cylinder through the connecting rods, crank shafts and gears. The intake ports 80 will be aligned with the chamber B and as the vane 50 moves under power from the explosion in chamber A, the mixture of air and fuel from the carburetor will enter into the chamber B. FIG. 10 shows a side view of the engine when it is in the same position as FIG. 9.

In FIG. 11, chamber A is shown in position with the vane 51 about half completed in its exhaust stroke (it has completed the power stroke and reversed direction). The flaps are then traveling in direction as indicated by arrow 100 and the positioning of the exhaust ports on the outer case 36 of the cylinder is shown in FIG. 12. Once the exhaust stroke has been completed the four cycles will be done and the parts will be back to position as shown in FIG. 4.

Thus, the shaft 20 oscillates back and forth first driving the cylinder, and then being driven by the flywheel effect of the cylinder to cause the compression stroke of the opposite cylinder from that which initially put in the energy.

To start the motor, the outer cylinder assembly can be driven by a convention starter motor.

The engine is simple in design and provides a high torque, low speed engine. By changing the length of the crank arms, the number of degrees of oscillation of the movable flaps can be changed. Also, more than two chambers can be provided. With two chambers, two power strokes are provided for each revolution of the outer cylinder.

What is claimed is:

1. In a rotary engine, a frame, a rotationally mounted cylinder having closed ends and a tubular center cylindrical portion on the frame, means to mount at least one first element in said cylinder fixed with respect to said frame, a second element inside said cylinder complemental to said first element, said second element being movable with respect to said first element to form a chamber of varying volume with respect thereto, means to normally slidably seal the peripheries of the elements with respect to their mating surfaces, means connected between said rotating cylinder and said second element to oscillate said second element with respect to the mating first element as said cylinder rotates, intake port means on said cylinder timed to communicate with the chamber when the elements move away on a first stroke, said elements then moving together to provide a second compression stroke, means to provide fuel combustion in the chamber at the end of the compression stroke thereby forcing the elements apart in a third power stroke, and exhaust port means on said cylinder to permit discharge of the fluids in the chamber, the mating elements next moving together on a fourth exhaust stroke as said cylinder rotates.

2. The combination as specified in claim 1 wherein said elements are comprised as flat disc like vanes.

3. The combination as specified in claim 1 wherein the individual strokes of the engine each occur while the cylinder rotates substantially 90°.

4. The combination as specified in claim 1 wherein the means for oscillating said second element toward and away from said first element includes a drive gear rotating with said cylinder, at least one driven gear engaging said drive gear, said driven gear driving crank shaft means, and said crank shaft means in turn driving the shaft to which the second element is mounted in an oscillating movement.

5. The combination as specified in claim 1 wherein the intake port for the chamber is positioned in one end wall thereof, and passes through a portion of the shaft on which the second element is mounted.

6. The combination as specified in claim 5 wherein the exhaust ports are defined in the outer side wall of said cylinder.

7. In a rotary engine, a frame, a rotationally mounted cylinder having closed ends and a tubular center cylindrical portion on the frame, means to mount a first set of elements in said cylinder in spaced apart relationship and mounted so that they slidingly sealingly engage the inner surfaces of the cylinder as it rotates, said first elements being fixed with respect to the frame, a second set of elements being concentrically mounted with said first set of elements and complemental thereto, said second set of elements being movable with respect to said first set of elements about the axis of said cylinder, means connected between said rotating cylinder and said second set of elements to oscillate said second set of elements with respect to said first set of elements when said cylinder rotates to vary the volume of space between mating elements, carburetor and intake port means on said cylinder timed so that a charge of air and fuel is placed between each pair of the mating elements when the elements move away from each other in a first stroke of each engine cycle, said elements then moving together to compress the air and fuel, ignition means to ignite the compressed air and fuel between the elements and drive the elements apart, and exhaust port means on said cylinder to permit discharge of gases from between the mating elements when they next move together.

8. The combination as specified in claim 7 wherein each set of said elements are comprised as flat disc like parallel plates that are positioned opposite from each other about the axis of said cylinder, the planes thereof being slightly offset.

9. The combination as specified in claim 7 wherein the means for oscillating said second set of elements toward and away from said first set of elements includes a drive gear rotating with said cylinder, a pair of planet gears engaging said drive gear, said planet gears driving crank shaft means, a shaft for mounting said second set of elements, separate connecting rod and pin means driven by said crank shaft means, and drive means between said connecting rods and said shaft to which the second set of elements are mounted.

10. The combination as specified in claim 7 wherein the intake ports for the engine are positioned in one end wall thereof and pass through a center portion of the shaft on which the second set of elements is mounted.

11. The combination as specified in claim 10 wherein the exhaust ports are defined in the outer side wall of said cylinder.

References Cited

UNITED STATES PATENTS

| 1,294,487 | 2/1919 | Laberge | 123—43 |
| 3,139,871 | 7/1964 | Larpent | 123—32 |

MARK NEWMAN, *Primary Examiner.*

R. D. BLAKESLEE, *Assistant Examiner.*